United States Patent
Jogan et al.

(10) Patent No.: US 11,923,147 B2
(45) Date of Patent: Mar. 5, 2024

(54) FILM CAPACITOR

(71) Applicant: Murata Manufacturing Co., Ltd., Nagaokakyo (JP)

(72) Inventors: Satoru Jogan, Nagaokakyo (JP); Hiroki Kitamura, Nishinomiya (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 72 days.

(21) Appl. No.: 17/555,637

(22) Filed: Dec. 20, 2021

(65) Prior Publication Data

US 2022/0115183 A1 Apr. 14, 2022

Related U.S. Application Data

(63) Continuation of application No. PCT/JP2020/018698, filed on May 8, 2020.

(30) Foreign Application Priority Data

Aug. 29, 2019 (JP) .................................. 2019-157102

(51) Int. Cl.
*H01G 4/224* (2006.01)
*H01G 4/30* (2006.01)
*H01G 4/32* (2006.01)

(52) U.S. Cl.
CPC ............... *H01G 4/224* (2013.01); *H01G 4/30* (2013.01); *H01G 4/32* (2013.01)

(58) Field of Classification Search
CPC ............. H01G 4/224; H01G 4/30; H01G 4/32
(Continued)

(56) References Cited

U.S. PATENT DOCUMENTS

2004/0120098 A1* 6/2004 Yamazaki ............ H05K 1/0256
361/301.5
2006/0104006 A1 5/2006 Saito et al.
(Continued)

FOREIGN PATENT DOCUMENTS

JP S59011615 A 1/1984
JP 2002124431 A 4/2002
(Continued)

OTHER PUBLICATIONS

Written Opinion of the International Searching Authority issued for PCT/JP2020/018698, dated Jul. 28, 2020.
(Continued)

*Primary Examiner* — Arun Ramaswamy
(74) *Attorney, Agent, or Firm* — ArentFox Schiff LLP

(57) ABSTRACT

A film capacitor that includes: an outer case defining an opening; a capacitor element within the outer case, the capacitor element including one or more metallized films, each metallized film including a resin film and a metal layer on a surface of the resin film; and a filling resin that fills a space between the capacitor element and the outer case, wherein the filling resin includes a first filling resin layer surrounding the capacitor element and a second filling resin layer disposed closer to the opening of the outer case than the first filling resin layer, the first filling resin layer and the second filling resin layer are made of the same resin and each contain a filler, and a filler content of the second filling resin layer is higher than a filler content of a portion of the first filling resin layer opposing the second filling resin layer.

14 Claims, 4 Drawing Sheets

(58) Field of Classification Search
USPC .................................. 361/301.4, 301.5, 323
See application file for complete search history.

(56) References Cited

U.S. PATENT DOCUMENTS

| | | | | |
|---|---|---|---|---|
| 2008/0273289 A1* | 11/2008 | Saito | ...................... | H01G 4/224 |
| | | | | 361/306.3 |
| 2010/0039748 A1* | 2/2010 | Fujii | ...................... | H01G 4/224 |
| | | | | 361/274.1 |
| 2011/0019338 A1 | 1/2011 | Sato et al. | | |

FOREIGN PATENT DOCUMENTS

| | | | | |
|---|---|---|---|---|
| JP | 2005108953 A | | 4/2005 | |
| JP | 2006147687 A | | 6/2006 | |
| JP | 2006253280 A | | 9/2006 | |
| JP | 2009191088 A | * | 8/2009 | |
| JP | 2011044682 A | | 3/2011 | |
| JP | 4733566 B2 | | 7/2011 | |
| JP | 2012069840 A | | 4/2012 | |
| JP | 2019081838 A | | 5/2019 | |
| JP | 2019083260 A | | 5/2019 | |
| WO | WO-2018128005 A1 * | | 7/2018 | ............... H01G 2/10 |

OTHER PUBLICATIONS

International Search Report issued for PCT/JP2020/018698, dated Jul. 21, 2020.

* cited by examiner

FILM CAPACITOR

CROSS REFERENCE TO RELATED APPLICATIONS

The present application is a continuation of International application No. PCT/JP2020/018698, filed May 8, 2020, which claims priority to Japanese Patent Application No. 2019-157102, filed Aug. 29, 2019, the entire contents of each of which are incorporated herein by reference.

FIELD OF THE INVENTION

The present invention relates to a film capacitor.

BACKGROUND OF THE INVENTION

A film capacitor is produced by, for example, providing a capacitor element having one or more wound or laminated metallized films, each metallized film including a metal deposited film on a surface of a resin film, housing the capacitor element in an outer case, filling the outer case with a resin, and curing the resin.

When such a film capacitor is used in a high-temperature and high-humidity environment and ingress of moisture occurs, the conductivity of the metal deposited film is lost and the capacitance decreases. In response to this, film capacitors having improved moisture resistance have been required.

Patent Literature 1 discloses a metallized film capacitor including a case with an opening, a capacitor element including one or more wound or laminated metallized films being in the case, and a resin that fills the case, the metallized film capacitor including a flat plate at the opening of the outer case, the plate covering the capacitor element and exposed to air at a surface opposite the capacitor element.

Patent Literature 2 discloses a molded case capacitor including a capacitor element including a pair of wound or laminated metallized films, each metallized film including a dielectric film and a metal deposition electrode thereon, an open top metallic case that houses the capacitor element, and a resin that fills the metallic case, wherein the resin contains a filler and the filler content of the resin gradually decreases from an inner bottom surface toward an opening surface of the metallic case.

Patent Literature 3 discloses a sheathing type electronic part including a capacitor element, an outer case that houses the capacitor element, a first filling resin layer surrounding the capacitor element, and a second filling resin layer surrounding the first filling resin layer, the first filling resin layer having an A hardness of 80 or less and the second filling resin layer having an A hardness of 90 or more.
Patent Literature 1: JP 2005-108953 A
Patent Literature 2: JP 2012-69840 A
Patent Literature 3: JP S59-11615 A

SUMMARY OF THE INVENTION

Patent Literature 1 discloses that the shielding flat plate disposed at the opening of the case can achieve improvement in thermal shock resistance and moisture resistance. However, the number of components increases, problematically leading to an increase in production cost.

Patent Literature 2 discloses that the filler content of a bottom side of the case is increased in order to improve heat dissipation. However, the filler content of an opening side of the case is low, problematically causing ingress of moisture from the opening side.

Patent Literature 3 has a problem of increasing production cost due to use of two resins, a resin having an A hardness of 80 or less and a resin having an A hardness of 90 or more, in combination.

The present invention was made to solve the above issues and aims to provide a film capacitor having excellent moisture resistance while suppressing production cost.

A film capacitor of the present invention includes: an outer case defining an opening; a capacitor element within the outer case, the capacitor element including one or more metallized films, each metallized film including a resin film and a metal layer on a surface of the resin film; and a filling resin that fills a space between the capacitor element and the outer case, wherein the filling resin includes a first filling resin layer surrounding the capacitor element and a second filling resin layer disposed closer to the opening of the outer case than the first filling resin layer, the first filling resin layer and the second filling resin layer are made of the same resin and each contain a filler, and a filler content of the second filling resin layer is higher than a filler content of a portion of the first filling resin layer opposing the second filling resin layer.

The present invention can provide a film capacitor having excellent moisture resistance while suppressing production cost.

DETAILED DESCRIPTION OF THE PREFERRED EMBODIMENTS

The film capacitor of the present invention is described below.

The present invention is not limited to the following preferred embodiments, and may be suitably modified without departing from the gist of the present invention.

Combinations of two or more preferred features described in the following preferred features are also within the scope of the present invention.

Film Capacitor

The film capacitor of the present invention includes an outer case defining an opening; a capacitor element within the outer case, the capacitor element including one or more metallized films, each metallized film including a resin film and a metal layer on a surface of the resin film; and a filling resin that fills a space between the capacitor element and the outer case, wherein the filling resin includes a first filling resin layer surrounding the capacitor element and a second filling resin layer disposed closer to the opening of the outer case than the first filling resin layer, the first filling resin layer and the second filling resin layer are made of the same resin and each contain a filler, and a filler content of the second filling resin layer is higher than a filler content of a portion of the first filling resin layer opposing the second filling resin layer.

In the film capacitor of the present invention, the filling resin that fills a space between the capacitor element and the outer case includes the first filling resin layer and the second filling resin layer, and the filler content of the second filling resin layer is higher than the filler content of a portion of the first filling resin layer opposing the second filling resin layer.

With a higher filler content, a filling resin layer has better moisture barrier properties. Thus, the film capacitor of the present invention including the second filling resin layer with a higher filler content disposed closer to the opening of the outer case than the first filling resin layer has excellent moisture resistance.

Also in the film capacitor of the present invention, the first filling resin layer and the second filling resin layer are made of the same resin. Accordingly, since the first filling resin layer and the second filling resin layer can be made without using different types of resins, additional production equipment is not needed, and the production cost can be reduced.

Figure 1A:
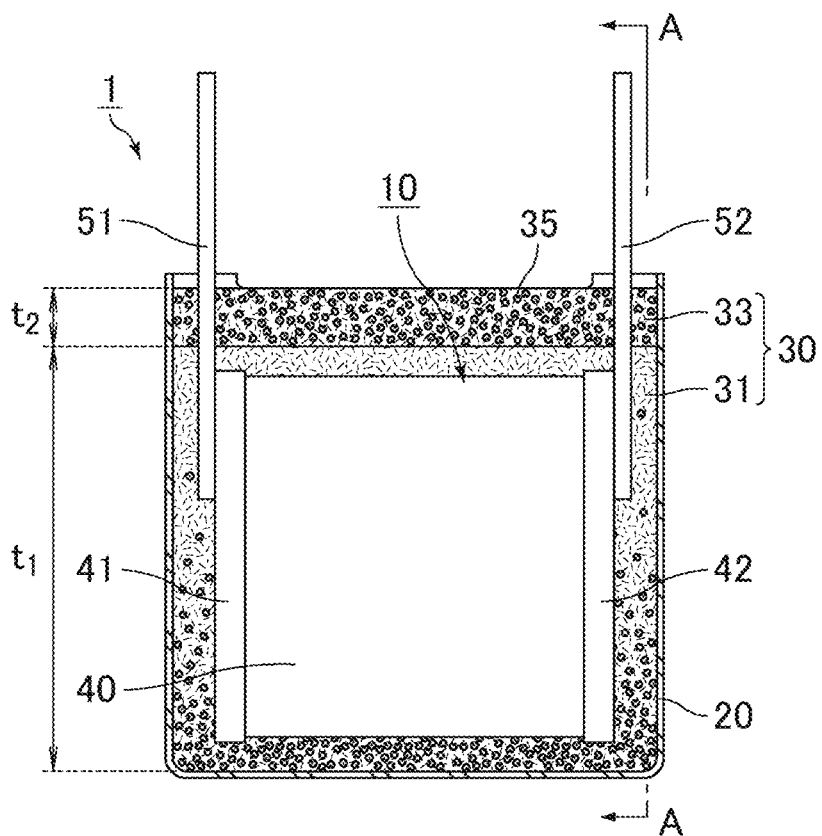
FIG. 1A is a schematic cross-sectional view of an example of a film capacitor of the present invention.
Figure 1B:
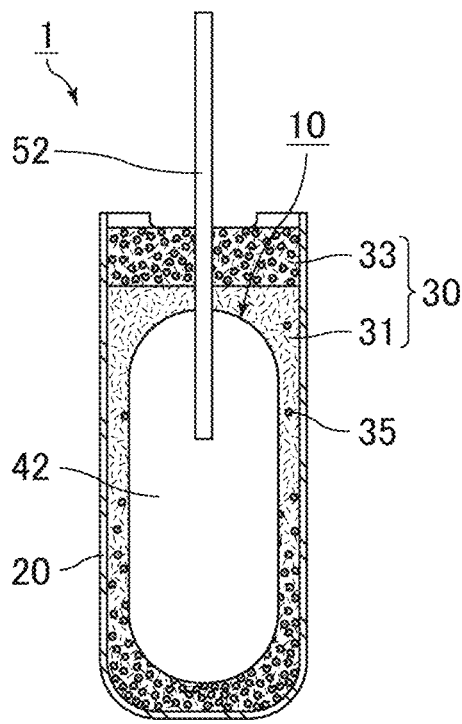
FIG. 1B is a cross-sectional view taken along the line A-A in FIG. 1A.

FIG. 1A is a schematic cross-sectional view of an example of the film capacitor of the present invention. FIG. 1B is a cross-sectional view taken along the line A-A in FIG. 1A.

A film capacitor 1 shown in FIG. 1A and FIG. 1B includes a capacitor element 10, an outer case 20 that houses the capacitor element 10, and a filling resin 30 that fills a space between the capacitor element 10 and the outer case 20.

The capacitor element 10 includes a wound body 40 of metallized films and a first external electrode 41 and a second external electrode 42 at the respective ends of the wound body 40. A first lead terminal 51 is connected to the first external electrode 41, and a second lead terminal 52 is connected to the second external electrode 42.

In the film capacitor 1 shown in FIG. 1A and FIG. 1B, a rectangular parallelepiped space is formed in the outer case 20, and the capacitor element 10 is disposed apart from inner surfaces of the outer case 20 and centered in the outer case 20. In order to hold the capacitor element 10, the space between outer surfaces of the capacitor element 10 and the inner surfaces of the outer case 20 is filled with the filling resin 30. The outer case 20 has a bottomed tubular shape having an opening at one end.

The filling resin 30 in the outer case 20 includes a first filling resin layer 31 surrounding the capacitor element 10 from the bottom of the outer case 20 and a second filling resin layer 33 disposed closer to an opening of the outer case 20 than the first filling resin layer 31.

In the film capacitor 1, a thickness $t_2$ of the second filling resin layer 33 is smaller than a thickness $t_1$ of the first filling resin layer 31.

The first filling resin layer 31 and the second filling resin layer 33 are made of the same resin and each contain a filler 35.

In the first filling resin layer 31, a distribution of the filler 35 varies in a direction from the opening toward the bottom of the outer case 20.

A filler 35 content of the second filling resin layer 33 is higher than a filler 35 content of a portion of the first filling resin layer 31 opposing the second filling resin layer 33.

As shown in FIG. 1A and FIG. 1B, the filler 35 content of the first filling resin layer 31 gradually decreases from the bottom toward the opening in the outer case 20.

FIG. 1A and FIG. 1B showing the filler 35 are schematic views of the filler present in the first filling resin layer 31 and the second filling resin layer 33 and do not show the actual size and distribution of the filler in the filling resin.

The higher the filler content of the filling resin, the higher the moisture resistance. Accordingly, the film capacitor of the present invention in which the filler content of the second filling resin layer is higher than the filler content of a portion of the first filling resin layer opposing the second filling resin layer has excellent moisture resistance.

In the film capacitor of the present invention, the portion of the first filling resin layer opposing the second filling resin layer means the part closest to the opening of the outer case in 10 equally divided parts of the first filling resin layer in the thickness direction. Thus, whether or not the filler content of the second filling resin layer is higher than the filler content of the portion of the first filling resin layer opposing the second filling resin layer can be confirmed in the following way.

First, the film capacitor is cut along the thickness direction of the filling resin layer together with the outer case to expose the boundary between the first filling resin layer and the second filling resin layer, and the thickness of the first filling resin layer is measured. Subsequently, a cross-section of the part closest to the opening of the outer case in 10 equally divided parts of the first filling resin layer in the thickness direction and a cross-section of the second filling resin layer are photographed with SEM-EDX, and elemental mapping is performed using elements in the filler. In the obtained elemental mapping images, when the amount (area %) of the filler present in the second filling resin layer per area is greater than the amount (area %) of the filler present in the first filling resin layer per area, the filler content of the second filling resin layer is higher than the filler content of the portion of the first filling resin layer opposing the second filling resin layer. A microscope may be used instead of SEM-EDX. In this case, elemental analysis is not performed, and the portion with the filler and the portion without the filler are separated from each other in an enlarged image obtained by a microscope to determine an area occupied by the filler.

In the film capacitor of the present invention, the thickness of the second filling resin layer is preferably 50% or less, more preferably 30% or less, still more preferably 15% or less of the thickness of a total thickness of both the first and second filling resin layers.

Preferably, in the film capacitor of the present invention, the filler content of the first filling resin layer gradually decreases from the bottom toward the opening in the outer case.

In the film capacitor, the filler in the filling resin may precipitate during the period from filling of the filling resin to curing of the filling resin. In this case, the filler content of the filling resin at the opening of the outer case is lower than the filler content of the filling resin at the bottom of the outer case. Even in such a case, in the film capacitor of the present invention, the second filling resin layer disposed closer to the opening of the outer case than the first filling resin layer prevents ingress of moisture from the opening of the case, which can achieve sufficient moisture resistance.

In the case where the filler precipitates, when the filler content is increased in advance in consideration of the precipitation of the filler, the filling resin may become too highly viscous, and failure of filling may occur or air bubbles may form. Further, when the filler content of the filling resin surrounding the capacitor element is too high, the linear expansion coefficient of the filling resin may decrease, and the filling resin surrounding the capacitor element may crack due to the volume change of the capacitor element.

In the film capacitor of the present invention, the second filling resin layer can prevent ingress of moisture from the opening of the case, and thus, the filler content is not necessary to increase in consideration of precipitation of the filler as described above. Accordingly, the moisture resistance can be improved while the occurrence of failure of filling and cracking of the filling resin surrounding the capacitor element are reduced or prevented.

Filling Resin

The first filling resin layer and the second filling resin layer defining the filling resin are made of the same resin and each contain a filler.

The filling resin can be suitably selected according to a required function.

The filling resin may be, for example, an epoxy resin or a silicone resin, and preferably contains an epoxy resin.

The curing agent for an epoxy resin may be an amine curing agent or an imidazole curing agent.

The filling resin contains a filler in order to improve the moisture resistance.

The filler may be silica, alumina, or the like.

Examples of the silica particles include spherical silica and crushed silica. These may be used in combination.

Preferably, the first filling resin layer and the second filling resin layer contain the same filler.

When the first filling resin layer and the second filling resin layer contain the same resin and the same filler, both the first filling resin layer and the second filling resin layer can be formed using the same equipment without using different types of resins and fillers. Thus, the production cost can be reduced.

In the film capacitor of the present invention, still more preferably, the average filler content of the first filling resin layer is equal to the filler content of the second filling resin layer.

When the first filling resin layer and the second filling resin layer contain the same resin and the same filler and the average filler content of the first filling resin layer is equal to the filler content of the second filling resin layer, both the first filling resin layer and the second filling resin layer can be formed using the same filling resin. Thus, the production cost can be particularly reduced.

The average filler content of the first filling resin layer means the average of the filler contents measured for the regions of 10 equally divided parts of the first filling resin layer in the thickness direction.

In the film capacitor of the present invention, preferably, the filling resin has a two-layer structure including the first filling resin layer and the second filling resin layer. The filling resin may optionally include a third filling resin layer in addition to the first filling resin layer and the second filling resin layer.

The third filling resin layer may be located at any position, and may be located between the first filling resin layer and the second filling resin layer or may be located further closer to the opening than the second filling resin layer.

The third filling resin layer may have any filler content, and the filler content of the third filling resin layer may be higher or lower than that of the second filling resin layer. The third filling resin layer may not contain a filler.

Capacitor Element

In the film capacitor of the present invention, for example, the capacitor element has a pillar shape having an oblong cross section, and includes external electrodes formed by, for example, metal spraying (metallikon) at both ends of the pillar shape in the central axis direction.

Figure 2A:
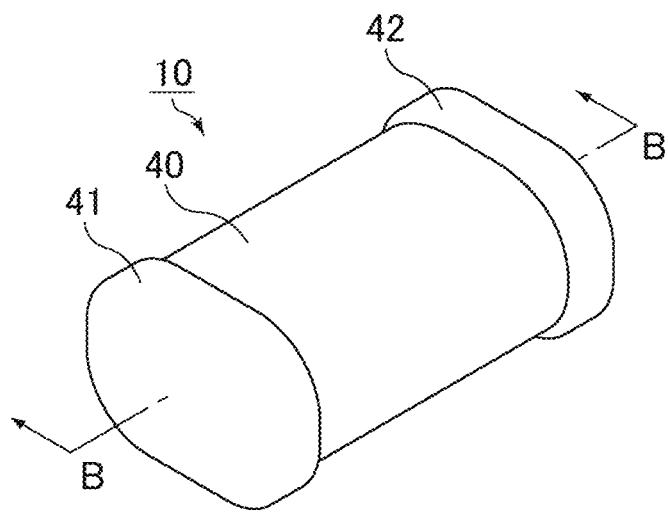
FIG. 2A is a schematic perspective view of an example of a capacitor element defining the film capacitor of the present invention.
Figure 2B:
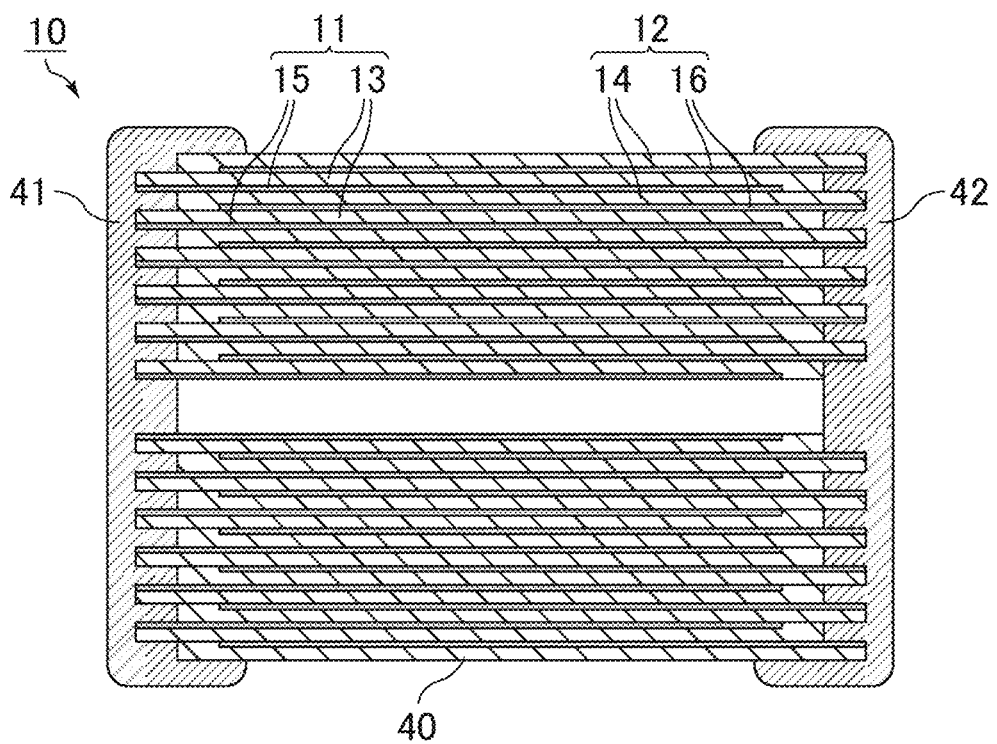
FIG. 2B is a cross-sectional view taken along the line B-B in FIG. 2A.

FIG. 2A is a schematic perspective view of an example of the capacitor element defining the film capacitor of the present invention. FIG. 2B is a cross-sectional view taken along the line B-B in FIG. 2A.

The capacitor element 10 shown in FIG. 2A and FIG. 2B includes the wound body 40 of metallized films, each metallized film including a first metallized film 11 and a second metallized film 12 wound in a laminated state, and the first external electrode 41 and the second external electrode 42 connected to both end faces of the wound body 40. As shown in FIG. 2B, the first metallized film 11 includes a first resin film 13 and a first metal layer (counter electrode) 15 on a surface of the first resin film 13. The second metallized film 12 includes a second resin film 14 and a second metal layer (counter electrode) 16 on a surface of the second resin film 14.

As shown in FIG. 2B, the first metal layer 15 and the second metal layer 16 oppose each other with the first resin film 13 or the second resin film 14 therebetween. Further, the first metal layer 15 is electrically connected to the first external electrode 41, and the second metal layer 16 is electrically connected to the second external electrode 42.

The first resin film 13 and the second resin film 14 may have different configurations, but preferably have the same configuration.

The first metal layer 15 is formed on one side of the first resin film 13 such that it extends to a first end but not to a second end. The second metal layer 16 is formed on one side of the second resin film 14 such that it extends to the second end but not to the first end. The first metal layer 15 and the second metal layer 16 are aluminum layers, for example.

Figure 3:
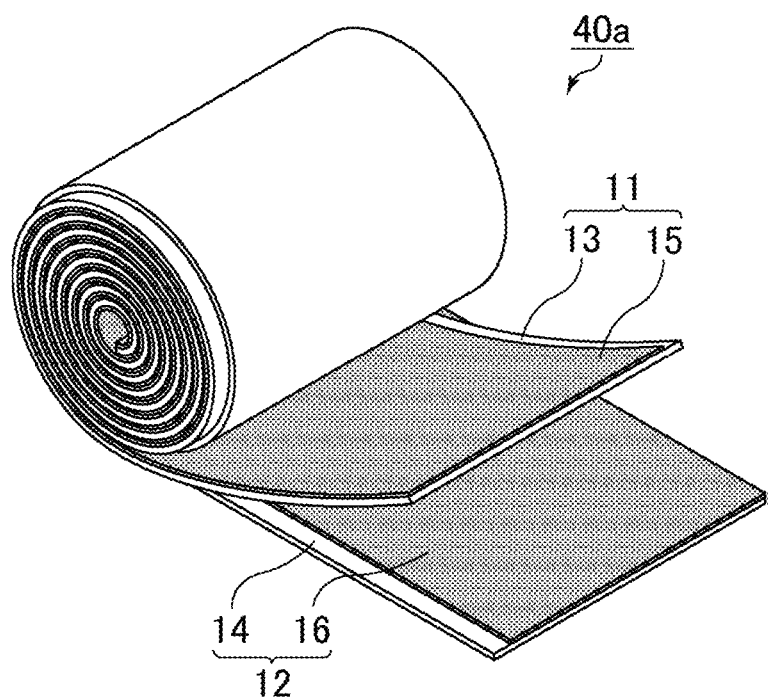
FIG. 3 is a schematic perspective view of an example of a wound body shown in FIG. 2A and FIG. 2B.

FIG. 3 is a schematic perspective view of an example of a wound body shown in FIG. 2A and FIG. 2B.

As shown in FIG. 2B and FIG. 3, the first resin film 13 and the second resin film 14 are laminated in a displaced relationship from each other in a width direction (in FIG. 2B, in a left-to-right direction) such that one end of the first metal layer 15 which extends to the periphery of the first resin film 13 is exposed from the laminate of the films and that one end of the second metal layer 16 which extends to the periphery of the second resin film 14 is also exposed from the laminate of the films. As shown in FIG. 3, the first resin film 13 and the second resin film 14 are wound in a laminated state into the wound body 40a. The first metal layer 15 and the second metal layer 16 are laminated while they maintain a state in which one end of the first metal layer 15 and one end of the second metal layer 16 are exposed.

In FIG. 2B and FIG. 3, the first resin film 13 and the second resin film 14 are wound such that the second resin film 14 is outside the first resin film 13 and that the first metal layer 15 and the second metal layer 16 face inside.

Figure 4:
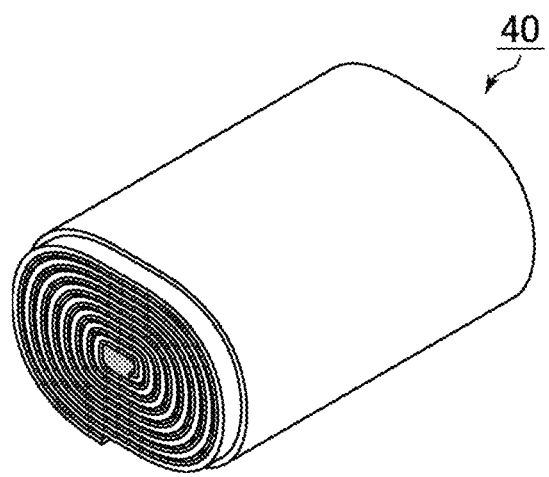
FIG. 4 is a schematic perspective view of another example of the wound body shown in FIG. 2A and FIG. 2B.

FIG. 4 is a schematic perspective view of another example of the wound body shown in FIG. 2A and FIG. 2B.

In the film capacitor of the present invention, when the capacitor element includes a wound body of metallized films, preferably, the wound body is pressed into a flat shape having an oval or oblong cross section as in the wound body 40 of the metallized films shown in FIG. 4, so that the wound body has a more compact shape.

The wound body 40 shown in FIG. 4 is formed by pressing the wound body 40a shown in FIG. 3 so as to have a flat cross-sectional shape. In this case, the outer case can be made smaller by reducing the dead space inside the outer case, so that the film capacitor can be made smaller as a whole.

In the film capacitor of the present invention, when the capacitor element includes a wound body of metallized films, the capacitor element may include a cylindrical winding shaft. The winding shaft is arranged on the central axis of the metallized films in a wound state, and serves as a spool for winding the metallized films.

The first external electrode 41 and the second external electrode 42 are formed by, for example, spraying zinc or the like onto both end surfaces of the wound body 40 of the metallized films obtained as described above. The first external electrode 41 is in contact with the exposed end of the first metal layer 15, and is thus electrically connected to the first metal layer 15. The second external electrode 42 is in contact with the exposed end of the second metal layer 16, and is thus electrically connected to the second metal layer 16.

In the film capacitor of the present invention, preferably, the resin films defining the capacitor element contain, as a main component, a resin containing at least one of a urethane bond or a urea bond. Examples of such a resin include a urethane resin having a urethane bond and urea resin having a urea bond. Examples may also include a resin having both a urethane bond and a urea bond. Specific examples thereof include curable resins and vapor-deposited polymer films which are described later.

The presence of a urethane bond and/or a urea bond can be confirmed using a Fourier transform infrared (FT-IR) spectrophotometer.

The term "main component of the resin films" as used herein refers to a component with the higher proportion (wt %), and preferably refers to a component whose proportion is more than 50 wt %. Thus, the resin films may contain other components in addition to the main component. Examples of the other components include additives such as silicone resin and uncured residues of starting materials such as a first organic material and a second organic material which are described later.

In the film capacitor of the present invention, the resin films defining the capacitor element may contain a curable resin as a main component. The curable resin may be a thermosetting resin or a photocurable resin. The curable resin may or may not contain at least one of a urethane bond or a urea bond.

The term "thermosetting resin" as used herein refers to a heat-curable resin, and the curing method is not limited. Thus, the thermosetting resin encompasses a resin cured by a method other than heat (such as light or electron beam) as long as the resin is heat curable. Some materials may start a reaction due to their own reactivity. The thermosetting resin also includes such materials that do not necessarily require external heat, light, or the like to start curing. The same applies to the photocurable resins, and the curing method is not limited.

In the film capacitor of the present invention, the resin films defining the capacitor element may each include a vapor-deposited polymer film as a main component. The vapor-deposited polymer film may or may not contain at least one of a urethane bond or a urea bond.

The term "vapor-deposited polymer film" refers to a film formed by vapor deposition polymerization. In principle, the curable resin includes such a film.

In the film capacitor of the present invention, preferably, the resin films defining the capacitor element are made of a cured product of the first organic material and the second organic material. Examples thereof include a cured product obtained by a reaction between a hydroxy group (OH group) of the first organic material and an isocyanate group (NCO group) of the second organic material.

When a cured product is obtained by the above reaction, the resulting films may contain uncured residues of the starting materials. For example, the resin films may contain at least one of an isocyanate group (NCO group) or a hydroxyl group (OH group). In this case, the resin films may contain either one or both of an isocyanate group and a hydroxyl group.

The presence of an isocyanate group and/or a hydroxy group can be confirmed using a Fourier transform infrared (FT-IR) spectrophotometer.

Preferably, the first organic material is a polyol having two or more hydroxyl groups (OH groups) in the molecule. Examples of the polyol include polyether polyols, polyester polyols, and polyvinyl acetoacetal. The first organic material may be any combination of two or more organic materials. The first organic material is preferably a phenoxy resin belonging to polyether polyols.

The second organic material is preferably an isocyanate compound, an epoxy resin, or a melamine resin having two or more functional groups in the molecule. The second organic material may be any combination of two or more organic materials.

Examples of the isocyanate compound include aromatic polyisocyanates such as diphenylmethane diisocyanate (MDI) and tolylene diisocyanate (TDI); and aliphatic polyisocyanates such as hexamethylene diisocyanate (HDI). Examples may also include modified products of these polyisocyanates, such as a modified product containing carbodiimide or urethane, for example. Of these, aromatic polyisocyanates are preferred, and MDI is more preferred.

Any epoxy resin may be used as long as it is a resin having an epoxy ring. Examples thereof include bisphenol A epoxy resins, epoxy resins having a biphenyl skeleton, epoxy resins having a cyclopentadiene skeleton, and epoxy resins having a naphthalene skeleton.

Any melamine resin may be used as long as it is an organic nitrogen compound having a triazine ring at the center of the structure and three amino groups around the triazine ring. Examples thereof include alkylated melamine resin. Examples may also include modified products of melamine.

In the film capacitor of the present invention, preferably, the resin films defining the capacitor element are obtained by molding a resin solution containing the first organic material and the second organic material into films and curing the films by heat treatment.

In other words, in the film capacitor of the present invention, preferably, the resin film includes a thermosetting resin.

In the film capacitor of the present invention, the resin films defining the capacitor element may contain a thermoplastic resin as a main component. Examples of the thermoplastic resin include highly crystalline polypropylene, polyethersulfone, polyetherimide, and polyarylate.

In the film capacitor of the present invention, the resin films defining the capacitor element may contain additives that provide other functions. For example, addition of a leveling agent can provide smoothness. A more preferred additive is a material having a functional group that reacts with a hydroxy group and/or an isocyanate group, which forms part of the crosslinked structure of the cured product. Examples of such a material include a resin having at least one functional group selected from the group consisting of an epoxy group, a silanol group, and a carboxy group.

In the film capacitor of the present invention, the resin films defining the capacitor element may have any thickness. Yet, the thickness of each resin film is preferably 5 μm or less, more preferably less than 3.5 μm, still more preferably 3.4 μm or less. At the same time, the thickness of the resin film is preferably 0.5 μm or more.

The thickness of the resin film can be measured by an optical film thickness gauge.

In the film capacitor of the present invention, the metal layers defining the capacitor element may contain any metal, but the metal layer preferably contains at least one selected from the group consisting of aluminum (Al), titanium (Ti), zinc (Zn), magnesium (Mg), tin (Sn), and nickel (Ni).

In the film capacitor of the present invention, the metal layers defining the capacitor element may have any thickness. Yet, in view of reducing or preventing damage to the metal layers, the thickness of each metal layer is preferably 5 nm to 40 nm.

The thickness of each metal layer can be determined by observing a cross-section obtained by cutting the metallized films in a thickness direction, using an electronic microscope such as a field emission scanning electron microscope (FE-SEM).

In the film capacitor of the present invention, the size and shape of the capacitor element are determined depending on the capacity of the capacitor, so that various sizes of capacitor elements can be used.

For example, when the capacity of the capacitor is 1 μF to 150 μF, the size of the capacitor element having an oblong cross section is preferably as follows: the oblong cross section has a major axis of 15 mm to 65 mm and a minor axis of 2 mm to 50 mm, and the length of the capacitor element in a longitudinal direction (a direction from a front cross section to a rear cross section, including the external electrodes) is 10 mm to 50 mm.

In this case, preferably, the outer case has an outer shape in which the long side of the bottom is 16 mm to 73 mm, the short side of the bottom is 3 mm to 58 mm, and the height of the outer case is 10.5 mm to 50.5 mm. In addition, the thickness of the outer case is preferably 0.5 mm to 3 mm.

In the film capacitor of the present invention, preferably, the volume of the capacitor element is 30% to 85% relative to the inner volume of the outer case. When the volume of the capacitor element is more than 85% relative to the inner volume of the outer case, it is difficult to fix the outer case and the capacitor element by the filling resin. When the volume of the capacitor element is less than 30% relative to the inner volume of the outer case, the outer case is too large relative to the capacitor element, resulting in a large film capacitor.

In the film capacitor of the present invention, the clearance between the inner surfaces of the outer case and the outer surfaces of the capacitor element is preferably 1 mm to 5 mm, more preferably 1 mm to 2 mm.

Outer Case

The outer case defining the film capacitor of the present invention has, for example, a bottomed tubular shape including an opening at an end.

In the film capacitor of the present invention, the outer case is made of a metal, an alloy, or a resin. Preferably, it is made of resin.

The outer case may be made of any type of resin composition and preferably contains polyphenylene sulfide (PPS) or liquid crystal polymers (LCP) as a resin.

Preferably, the outer case includes a liquid crystal polymer (LCP) as a resin.

The outer case including a liquid crystal polymer (LCP) as a resin has excellent moisture resistance.

Examples of the LCP in the resin forming the outer case include LCP containing p-hydroxybenzoic acid and a 6-hydroxy-2-naphthoic acid group in the skeleton. Other LCPs that can be used are those obtained by polycondensation of various components such as phenol, phtalic acid, and ethylene terephtalate, other than p-hydroxybenzoic acid and 6-hydroxy-2-naphthoic acid group.

LCP can be classified into type I, type II, and type III. Yet, examples of materials include those of the LCP mentioned above.

Preferably, the resin composition further contains an inorganic filler in addition to LCP.

The inorganic filler contained in the resin composition may be a material having higher strength than the LCP. The inorganic filler is preferably a material having a higher melting point than the LCP, and is more preferably a material having a melting point of 680° C. or higher.

The form of the inorganic filler is not limited. Examples thereof include those having a shape with a longitudinal direction, such as fibrous inorganic fillers and plate-shaped inorganic fillers. Two or more of these inorganic fillers may be used in combination. Preferably, the resin composition contains a fibrous inorganic material and/or a plate-shaped inorganic material as the inorganic filler.

As used herein, the term "fibrous" refers to a shape in which the length of the filler in the longitudinal direction and the cross-sectional diameter in a cross section perpendicular to the longitudinal direction satisfy the following relationship where the length in longitudinal direction divided by the cross-sectional diameter is greater than or equal to 5 (i.e., the aspect ratio is 5:1 or greater). Here, the cross-sectional diameter is the distance between two points with the longest distance therebetween on the outer circumference of the cross section. When the cross-sectional diameter varies in the longitudinal direction, a portion with the largest cross-sectional diameter is used for the measurement.

The term "plate-shaped" refers to a shape in which the cross-sectional diameter of a surface having the largest projected area and the maximum height in a direction perpendicular to the cross section satisfy the following relationship where the cross-sectional diameter divided by the height is greater than or equal to 3.

In the film capacitor of the present invention, the resin composition may include an inorganic filler satisfying both the "fibrous" and "plate-shaped" shapes described above. In this case, the inorganic filler contains only one inorganic material. Such a case is however also represented by the expression "the resin composition contains both a fibrous inorganic material and a plate-shaped inorganic material as the inorganic filler".

Preferably, the inorganic filler is dispersed in the outer case, and at least a portion of the filler is oriented from the bottom of the case toward the opening and at least a portion of the filler is oriented toward the adjacent lateral walls on each of the lateral wall of the lateral portions of the outer case.

Preferably, the inorganic filler has a diameter of at least 5 μm and a length of at least 50 μm. In particular, preferably, the inorganic filler is dispersed throughout the outer case, without forming aggregations.

Specific examples of the inorganic filler include materials such as fibrous glass filler, plate-shaped talc, and plate-shaped mica. In particular, preferably, the inorganic filler contains a glass filler as a main component.

When the outer case is made of a resin composition containing LCP and an inorganic filler, the amount of the inorganic filler in the resin composition is preferably 54 wt % or less, more preferably 50 wt % or less, in order to ensure moldability of the outer case. At the same time, the amount of the inorganic filler in the resin composition is preferably 30 wt % or more, more preferably 45 wt % or more.

The amount of the inorganic filler in the resin composition can be determined as follows: using a 0.5-mm thick test piece (20 mm×20 mm), the weight of residual components regarded as inorganic components is measured by ash measurement or thermogravimetric analysis, and the amount of the inorganic filler is calculated from the initial weight and the weight of the residual components.

Specifically, the measurement method includes burning organic materials and heating the combustion residue at a high temperature until a constant mass is obtained, based on JIS K 7250 Method A (direct incineration method).

When the outer case is made of a resin composition containing LCP and an inorganic filler, the amount of the LCP in the resin composition is preferably 46 wt % to 70 wt %, more preferably 50 wt % to 55 wt %.

When the outer case is made of a resin composition, the resin composition may contain polyphenylene sulfide (PPS) instead of LCP.

Preferably, the resin composition further contains an inorganic filler in addition to PPS.

The inorganic filler contained in the resin composition containing PPS may be the same as that contained in the resin composition containing LCP.

Preferably, the resin composition contains a fibrous inorganic material and/or a plate-shaped inorganic material as the inorganic filler. Specific examples of the inorganic filler include materials such as fibrous glass filler, plate-shaped talc, and plate-shaped mica. In particular, preferably, the inorganic filler contains a glass filler as a main component.

When the outer case is made of a resin composition containing PPS and an inorganic filler, preferably, the amount of the inorganic filler in the resin composition is 60 wt % or less, in order to ensure moldability of the outer case. At the same time, the amount of the inorganic filler in the resin composition is preferably 30 wt % or more, more preferably 45 wt % or more.

When the outer case is made of a resin composition containing PPS and an inorganic filler, the amount of PPS in the resin composition is preferably 40 wt % to 70 wt %, more preferably 40 wt % to 55 wt %.

The outer case made of a resin composition can be produced by, for example, a method such as injection molding.

When the outer case is made of a metal or an alloy, a material such as aluminum, magnesium, iron, stainless steel, copper, or an alloy thereof can be used. Of these, aluminum or an aluminum alloy is preferred.

The outer case made of a metal or an alloy can be produced by, for example, a method such as impact molding.

Lead Terminal

In the film capacitor of the present invention, lead terminals protrude from the filling resin filling the outer case to the outside of the outer case.

Portions of the lead terminals which are electrically connected to the respective external electrodes of the capacitor element are provided in small regions of the external electrodes. Thus, when a load is applied to the lead terminals, the lead terminals may be separated from the external electrodes. Thus, in the outer case, the filling resin is located around the external electrodes of the capacitor element and the lead terminals so as to tightly fix the external electrodes and the lead terminal. As a result, even when a load is applied to the protruding portions of the lead terminals, the connection between the lead terminals and the external electrodes is reinforced by the filling resin, preventing or reducing separation therebetween.

The lead terminals may be connected to the external electrodes in the middle of the external electrodes or at ends of the electrodes near the opening as shown in FIG. 1 of JP 4733566 B.

Method of Producing Film Capacitor

The following describes a method of producing the film capacitor of the present invention.

The film capacitor of the present invention is produced, for example, as follows: a laminate of two metallized films each including a resin film and a metal layer on a surface of the resin film is wound to provide a wound body, an external electrode is formed at each end of the wound body to provide a capacitor element, the capacitor element is housed in an outer case, the outer case is filled with a filling resin, the filling resin is cured to form a first filling resin layer, an additional filling resin is poured over the surface of the first filling resin layer, and the filling resin is cured to form a second filling resin layer.

An example of the method of producing the film capacitor of the present invention is described with reference to FIG. 5A, FIG. 5B, and FIG. 5C.

Figure 5A:
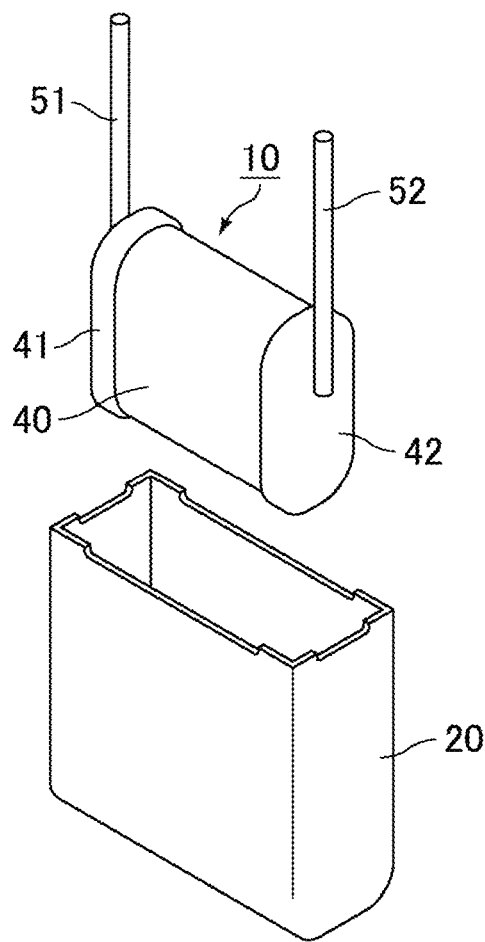
FIG. 5A, FIG. 5B, and FIG. 5C are schematic diagrams of an example of a method of producing the film capacitor of the present invention.
Figure 5B:
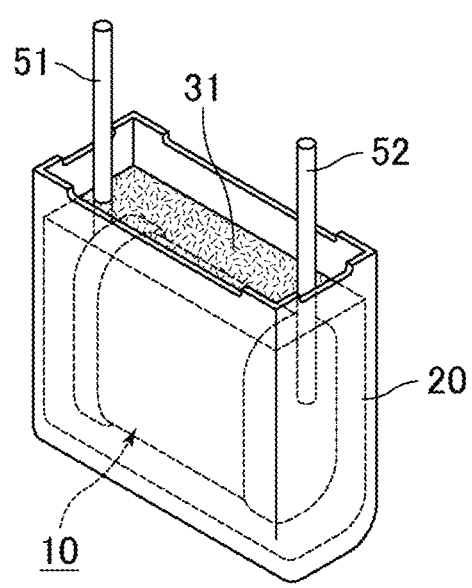
Figure 5C:
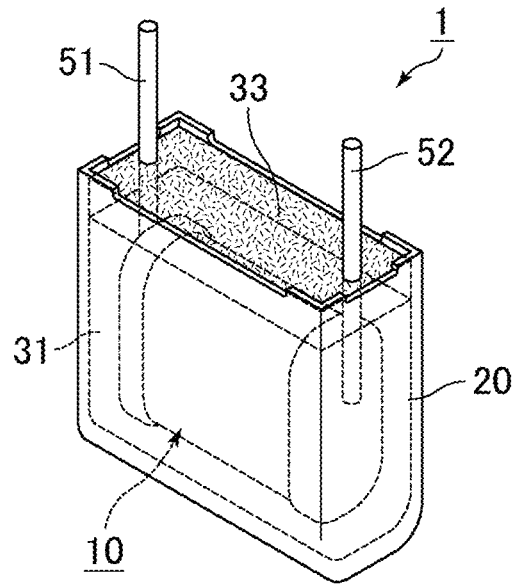

FIG. 5A, FIG. 5B, and FIG. 5C are schematic diagrams of an example of the method of producing the film capacitor of the present invention.

First, as shown in FIG. 5A, the first external electrode 41 and the second external electrode 42 are formed on the respective ends of the wound body 40, the first lead terminal 51 and the second lead terminal 52 are welded to provide the capacitor element 10, and the capacitor element 10 is housed in the outer case 20.

Then, as shown in FIG. 5B, the outer case 20 is filled with a filling resin, and the filling resin is cured to form the first filling resin layer 31. Finally, as shown in FIG. 5C, an additional filling resin is poured over the first filling resin layer 31 and cured to form the second filling resin layer 33. Thus, the film capacitor 1 of the present invention can be obtained.

The filling resin for forming the first filling resin layer 31 and the filling resin for forming the second filling resin layer 33 are the same as each other.

The filling resin for forming the first filling resin layer 31 and the filling resin for forming the second filling resin layer 33 each contain a filler.

Preferably, the filling resin for forming the first filling resin layer 31 and the filling resin for forming the second filling resin layer 33 contain the same filler. In this case, still more preferably, the filler content of the filling resin for forming the first filling resin layer 31 is equal to the filler content of the filling resin for forming the second filling resin layer 33.

When the filling resin for forming the first filling resin layer 31 and the filling resin for forming the second filling resin layer 33 are the same as each other, contain the same filler, and have the same filler content, the filling resin for forming the first filling resin layer 31 and the filling resin for forming the second filling resin layer 33 have the same composition. In other words, the filling resin layers are formed under the same conditions including the types of monomers defining the resins, the blending ratios of the monomers, and the type and amount of the filler.

When the first filling resin layer 31 and the second filling resin layer 33 are formed using filling resins of the same composition, they can be formed using the same equipment. Thus, the production cost can be particularly reduced.

Even when the filling resins of the same composition are used, the filler in the filling resin precipitates before the first filling resin layer 31 is cured, leading to a distribution of the filler that varies in a direction from the opening toward the bottom of the outer case. This leads to a relative increase in the filler concentration of the first filling resin layer 31 on the bottom side of the outer case and to a relative decrease in the filler concentration of a portion of the first filling resin layer 31 opposing the second filling resin layer 33.

OTHER EMBODIMENTS

FIG. 1A and FIG. 1B each show an example where a single capacitor element is housed in a single outer case. For example, as shown in JP 2012-69840 A, multiple capacitor elements may be housed in a single outer case.

In addition, the above has described the case where the film capacitor is a wound film capacitor in which the first metallized film and the second metallized film are wound in a laminated state. Yet, the film capacitor may be a multilayer film capacitor in which the first metallized film and the second metallized film are laminated. The multilayer film capacitor can also achieve the above-described effects of the present invention.

EXAMPLES

Examples that more specifically disclose the film capacitor of the present invention are described below. The present invention is not limited to these examples.

Example 1

Preparation of Film Capacitor

A mixture of polyvinyl acetal and a polyisocyanate was cured to prepare a dielectric resin film made of a thermosetting resin. Aluminum was vapor deposited as an electrode on the dielectric resin film to provide a metallized film. Such metallized films were wound into a cylindrical wound body. Subsequently, zinc was thermally sprayed to both end surfaces of the wound body to lead out the electrode, and a lead was welded to each extraction electrode to prepare a capacitor element. Then, the capacitor element was housed in an outer case made of PPS, the outer case was filled with an epoxy resin containing 55% by weight of a filler so that the epoxy resin surrounded the capacitor element, and the epoxy resin was cured to form a first filling resin layer. Finally, an epoxy resin having the same composition as the epoxy resin forming the first filling resin layer was poured over the first filling resin layer into a thin layer and cured to form a second filling resin layer.

The epoxy resin forming the first filling resin layer and the epoxy resin forming the second filling resin layer had the same composition, and when the outer case is filled with the epoxy resins, the epoxy resins forming the first filling resin layer and the second filling resin layer had the same filler content. Silica particles were used as the filler.

The first filling resin layer had a thickness of 26 mm, and the second filling resin layer had a thickness of 4 mm.

Examples 2 and 3 and Comparative Example 1

Film capacitors of Examples 2 and 3 and Comparative Example 1 were prepared as in Example 1, except that the type of the resin included in the outer case and the type of the resin composition included in the resin films were changed to those shown in Table 1. In Comparative Example 1, a second filling resin layer was not formed, and a first filling resin layer was formed so as to have the same thickness as the sum of the thicknesses of the first filling resin layer and the second filling resin layer in Example 1.

Confirmation of Filler Content

The film capacitors of Examples 1 to 3 were each cut along the thickness direction of the filling resin layer together with the outer case to expose the boundary between the first filling resin layer and the second filling resin layer. A part closest to the opening of the outer case in 10 equally divided parts of the first filling resin layer in the thickness direction and the second filling resin layer were observed with SEM-EDX, and elemental mapping was performed. The result showed that the filler content per area of the second filling resin layer was higher than the filler content per area of the first filling resin layer, and the filler content of the second filling resin layer was higher than the filler content of a portion of the first filling resin layer opposing the second filling resin layer.

As for the film capacitor of Comparative Example 1 which had no boundary between the first filling resin layer and the second filling resin layer, the filler contents thereof were compared with each other by assuming that the film capacitor of Comparative Example 1 had a boundary at the same position as the boundary between the first filling resin layer and the second filling resin layer in the film capacitor of Example 1. The result showed that a part closest to the opening of the outer case in 10 equally divided parts of a portion corresponding to the first filling resin layer had a higher filler content than a portion corresponding to the second filling resin layer.

Moisture Resistance Load Test

A voltage (300 V) was applied to each of the film capacitors of Examples 1 to 3 and Comparative Example 1 at a temperature of 85° C. and a relative humidity of 85%, and the time taken to decrease the capacitance by 5% was measured. Table 1 shows the results.

A film capacitor in which the time taken to decrease the capacitance by 5% was more than 1500 hours was evaluated to be sufficiently moisture resistant (evaluation: Good). A film capacitor in which the time taken to decrease the capacitance by 5% was less than 1500 hours was evaluated not to be sufficiently moisture resistant (evaluation: Poor).

TABLE 1

| | Resin included in dielectric film | Material of outer case | Filler content[*1] | Moisture resistance load test | |
|---|---|---|---|---|---|
| | | | | Time [hour] | Evaluation |
| Example 1 | Thermosetting resin[*2] | PPS | Higher | 1690 | Good |
| Example 2 | Thermosetting resin[*2] | LCP | Higher | 1780 | Good |
| Example 3 | Polypropylene | PPS | Higher | 1580 | Good |
| Comparative Example 1 | Polypropylene | PPS | Not Higher | 1280 | Poor |

[*1]Cases where the filler content of the second filling resin layer is higher than the filler content of a portion opposing the second filling resin layer in the first filling resin layer are indicated as "Higher", and other cases are indicated as "Not Higher".
[*2]In Table 1, the thermosetting resin refers to a thermosetting resin prepared by curing a mixture of polyvinyl acetal and a polyisocyanate.

The results of the moisture resistance load test in Table 1 demonstrated that the film capacitors of the present invention took more than 1500 hours for the capacitance to decrease by 5%, and had excellent moisture resistance. Such a film capacitor of the present invention was achieved by the second filling resin layer being able to reduce or prevent ingress of moisture from the opening of the outer case.

REFERENCE SIGNS LIST 1 film capacitor
10 capacitor element
11 first metallized film
12 second metallized film
13 first resin film
14 second resin film
15 first metal layer
16 second metal layer
20 outer case
30 filling resin
31 first filling resin layer
33 second filling resin layer
35 filler
40, 40a wound body of metallized films
41 first external electrode
42 second external electrode
51 first lead terminal
52 second lead terminal
$t_1$ thickness of first filling resin layer
$t_2$ thickness of second filling resin layer

The invention claimed is:

1. A film capacitor comprising:
an outer case defining an opening;
a capacitor element within the outer case, the capacitor element including one or more metallized films, each metallized film including a resin film and a metal layer on a surface of the resin film; and
a filling resin that fills a space between the capacitor element and the outer case,
wherein the filling resin includes a first filling resin layer surrounding the capacitor element and a second filling resin layer disposed closer to the opening of the outer case than the first filling resin layer,
the first filling resin layer and the second filling resin layer are made of the same resin and each contain a filler,
a filler content of the second filling resin layer is higher than a filler content of a portion of the first filling resin layer opposing the second filling resin layer, and an average filler content of the first filling resin layer is equal to the filler content of the second filling resin layer.

2. The film capacitor according to claim 1, wherein a material of the outer case includes a liquid crystal polymer.

3. The film capacitor according to claim 1, wherein the resin film of the capacitor element includes a thermosetting resin.

4. The film capacitor according to claim 1, wherein the filling resin only has a two-layer structure including the first filling resin layer and the second filling resin layer.

5. The film capacitor according to claim 1, wherein a thickness of the second filling resin layer is smaller than a thickness of the first filling resin layer.

6. The film capacitor according to claim 1, wherein the filler content of the first filling resin layer gradually decreases from the bottom toward the opening of the outer case.

7. The film capacitor according to claim 1, wherein a thickness of the second filling resin layer is 50% or less of a total thickness of both the first and second filling resin layers.

8. The film capacitor according to claim 1, wherein a thickness of the second filling resin layer is 30% or less of a total thickness of both the first and second filling resin layers.

9. The film capacitor according to claim 1, wherein a thickness of the second filling resin layer is 15% or less of a total thickness of both the first and second filling resin layers.

10. The film capacitor according to claim 1, wherein the filling resin is selected from an epoxy resin or a silicone resin.

11. The film capacitor according to claim 10, wherein the filler is selected from silica or alumina.

12. The film capacitor according to claim 1, wherein the filler is selected from silica or alumina.

13. The film capacitor according to claim 1, wherein the first filling resin layer and the second filling resin layer contain the same filler.

14. The film capacitor according to claim 13, wherein the filler is selected from silica or alumina.

* * * * *